US006316573B1

(12) United States Patent
Klauck et al.

(10) Patent No.: US 6,316,573 B1
(45) Date of Patent: Nov. 13, 2001

(54) SOLID ADHESIVE MATERIAL WHICH PEELS OFF SMOOTHLY

(75) Inventors: Wolfgang Klauck, Meerbusch; Wolfgang Maier, Duesseldorf, both of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 1 days.

(21) Appl. No.: 09/125,735

(22) PCT Filed: Feb. 17, 1997

(86) PCT No.: PCT/EP97/00730

§ 371 Date: Aug. 24, 1998

§ 102(e) Date: Aug. 24, 1998

(87) PCT Pub. No.: WO97/31046

PCT Pub. Date: Aug. 28, 1997

(30) Foreign Application Priority Data

Feb. 24, 1996 (DE) ............................................. 196 07 036
Sep. 9, 1996 (DE) ............................................. 196 36 530

(51) Int. Cl.⁷ .................... C08G 18/30; C08G 18/34; C08G 18/36; C08G 18/38; C07C 271/06

(52) U.S. Cl. .................... 528/49; 156/331.4; 156/331.7; 528/59; 528/67; 528/73; 528/74.5; 528/905; 560/24; 560/25; 560/26; 560/33; 560/115; 560/157; 560/158; 560/165; 560/166; 560/330; 560/336; 564/32; 562/27

(58) Field of Search ............................ 156/331.4, 331.7; 528/49, 59, 74.5, 905, 67, 73; 560/330, 336, 24, 25, 33, 26, 115, 157, 158, 165, 166; 564/32; 562/27

(56) References Cited

U.S. PATENT DOCUMENTS 3,676,382 * 7/1972 Turbak et al. .......................... 524/752
4,011,311 3/1977 Noomen et al. ........................ 424/65
4,125,491 * 11/1978 Gorman ................................ 524/476
4,561,922 12/1985 Peerman et al. .................... 156/331.4
5,286,787 * 2/1994 Podola et al. .......................... 524/773
5,371,131 12/1994 Gierenz et al. ........................ 524/394
5,433,775 * 7/1995 Gardenier et al. ................. 106/206.1
5,525,654 * 6/1996 Podola et al. .......................... 524/199
5,612,408 * 3/1997 Konig et al. ............................ 524/591

FOREIGN PATENT DOCUMENTS

| 24 19 067 | 11/1974 | (DE) . |
| 42 42 687 | 6/1994 | (DE) . |
| 195 19 391 | 11/1996 | (DE) . |
| 0 188 809 | 7/1986 | (EP) . |
| 0 405 329 | 1/1991 | (EP) . |
| 0 665 250 | 8/1995 | (EP) . |
| WO94/13726 | 6/1994 | (WO) . |

OTHER PUBLICATIONS

Kunststoff–Handbuch, vol. 7, Polyurethane; p. 108; 1993.

DIN 55958, Dec. 1988.

Karsten's "Lackrohstoff—Tabellen", 9th Edition, 1992, Vincentz Verlag, Hannover, pp. 55–117.

Jordan's "Klebharze", Hinterwalder Verlag, Muenchen 1994, pp. 5–32.

* cited by examiner

Primary Examiner—Rabon Sergent
(74) Attorney, Agent, or Firm—Wayne C. Jaeschke; Stephen D. Harper

(57) ABSTRACT

An adhesive paste, free of water, based on a reaction product of a polyisocyanate component and a co-reactant selected from the group consisting of a polyol, a monofunctional fatty derivative component and mixtures thereof, wherein the reaction product contains moisture reactive isocyanate groups.

20 Claims, No Drawings

SOLID ADHESIVE MATERIAL WHICH PEELS OFF SMOOTHLY

BACKGROUND OF THE INVENTION

1. Field of the Invention

This invention relates to a firm, adhesive and smooth-rubbing paste based on reaction products of polyisocyanates, to its production and to its use.

2. Discussion of Related Art

Pastes of the type in question are known. Thus, DE 24 19 067 describes a stick of a gel-forming agent, water and an active component. The gel-forming agent is a reaction product of an aromatic diisocyanate with mono- and/or dialkanolamines containing 2 to 16 carbon atoms. The active component can be an adhesive, for example polyacrylamide, polyvinyl acetate, polyacrylate, polyvinyl alcohol, polyvinyl methyl ether and synthetic or natural rubbers. There is no mention of a polyurethane as the adhesive component. The stick has to be protected against drying out to remain usable.

EP 405 329 describes firm, smooth-rubbing adhesive sticks based on a soap gel as the gel-forming component and an aqueous polyurethane dispersion as the adhesive component. The polyurethane is a reaction product of a polyol or a polyol mixture, an isocyanate component with a functionality of two or more, a component capable of salt formation in the form of an alkaline aqueous solution and/or a nonionic hydrophilic modifying agent and, if desired, a chain-extending agent. The adhesive stick contains water and has to be protected against drying out to remain usable.

WO 94/113726 describes a hydrophilic high molecular weight nonionic polyurethane which may be used in water-free form as a hotmelt adhesive. The polyurethane is characterized by the following structural units:
a) $-O-(CH_2-CH_2-O)_n-$,
  where n =8 to 500 and more particularly 20 to 300;
b) $-CO-NH-X-NH-CO-$, where X is an aliphatic or cycloaliphatic radical, more particularly a residue of m-tetramethyl xylene diisocyanate (TMXDI);
c) $-O-Y-O$,
  where Y is a hydrophobic group, more particularly either
  $(-CH_2-CH(CH_3)-O)_m-CH_2-CH(CH_3)-$,
  $(-CH_2-CH(C_2H_5)-O)_m-CH_2-CH(C_2H_5)-$ and
  $(-CH_2-CH_2-CH_2-CH_2-O)_m-CH_2-CH_2-CH_2-CH_2-$
  where m =8 to 500 and more particularly 20 to 300,
  or alkylene or cycloalkylene groups containing 2 to 44 and, more particularly, 6 to 36 carbon atoms,
  c) making up 0 to 40% by weight, preferably 2 to 30% by weight and more preferably 5 to 25% by weight, based on a)+c) in the polyurethane.

There is no reference to bonding at room temperature in the water-free state.

Earlier German patent application 195 19 391 describes a polyurethane adhesive which may be used in water-free form as an adhesive stick. The polyurethane may be prepared from the following components:
a) at least one aliphatic or aromatic diisocyanate, preferably from the following group: MDI, TDI, HDI, IPDI and, above all, TMXDI,
b) at least one crystallizing polyester or polyether diol, more particularly from the following group:
  polyethylene glycol with a molecular weight (number average) of 200 to 40,000,
  polytetrahydrofuran with a molecular weight of 200 to 4,000,
  copolymer of ethylene oxide and propylene oxide with a molecular weight of 200 to 40,000, preferably a block copolymer with the structure PEG/PPG/PEG and with a PEG content of 10 to 80% by weight, and
  a polyester diol, more particularly polycaprolactone with a molecular weight of 200 to 50,000,
c) optionally at least one diol capable of forming ions, more particularly for forming carboxylates, and
d) optionally at least one trihydric or higher polyol, such as glycerol and TMP, and
e) optionally at least one hydrophobic diol, more particularly from the following group:
  polypropylene glycol with a molecular weight of 200 to 4,000 and
  alkanediol containing 1 to 100, preferably 2 to 50 and more preferably 5 to 30 carbon atoms, the ratio of isocyanate groups to hydroxyl groups being variable from 0.5 to 1.2:1 and, more particularly, from 0.7 to 1:1.

The adhesive stick does not contain any free NCO groups.

The strengths of all adhesive sticks are high enough for paper, but not for other substrates. In addition, the wet strengths of the adhesive pastes mentioned are very poor. Accordingly, the problem addressed by the present invention was to provide a firm smooth-rubbing adhesive paste which would not have any of these disadvantages and which would be distinguished not only by easy handling, but also by favorable performance properties. More particularly, the adhesive paste would be easy to apply, would allow for early correction of the bond and would still develop high ultimate strength and, optionally, water resistance.

The solution provided by the invention is defined in the claims and lies essentially in a firm, smooth-rubbing adhesive paste based on reaction products of a polyisocyanate, the paste being water-free and containing moisture-reactive NCO groups.

A paste is regarded as "firm" when it is capable of forming dimensionally stable geometric objects on its own. In particular, it should have a deformation load of 10 to 150 at 20° C. as measured by the compressive strength method described hereinafter.

A paste is regarded as "adhesive" when it is capable of attaching lightweight materials at least, such as paper or paperboard, to flat surfaces at room temperature, even without fixing.

A paste is regarded as "smooth-rubbing" when between 0.5 and 0.1 mm per m and, more particular, between 0.25 and 0.35 mm/m are rubbed off at the application temperature, more particularly at 20 to 25° C., as measured by the rub-off method described hereinafter. According to the invention, the application temperature may rise to 10° C. below the melting point. It may of course also be above the melting point, in which case the paste is applied in the same way as a normal hotmelt adhesive.

The isocyanate content of the paste according to the invention is in the range from 0.5 to 20 g NCO/100 g of paste and, more particularly, in the range from 1 to 15 g.

The polyisocyanates are reacted directly or indirectly with monofunctional fatty derivatives. The monofunctional fatty derivatives are preferably fatty alcohols, fatty amines and fatty acids. Fatty alcohols are linear saturated or unsaturated primary alcohols obtainable by reduction of triglycerides, fatty acids or fatty acid methyl esters. Specific examples are capryl alcohol, 1-nonyl alcohol, capric alcohol, lauryl alcohol, myristyl alcohol, cetyl alcohol, stearyl alcohol, oleyl alcohol, erucyl alcohol, ricinol alcohol, linoleyl alcohol, linolenyl alcohol, arachidyl alcohol, gadoleyl alcohol, behenyl alcohol, erucyl alcohol, brassidyl alcohol.

Fatty acids are aliphatic saturated carboxylic acids with, almost exclusively, an unbranched carbon chain. They are normally prepared from fats and oils. Specific examples of fatty acids are capric acid, undecanoic acid, lauric acid, tridecanoic acid, myristic acid, pentadecanoic acid, palmitic acid, margaric acid, stearic acid, nonadecanoic acid, arachic acid, behenic acid, palmitoleic acid, oleic acid and erucic acid.

The fatty amines are normally prepared from the fatty acids with ammonia via the fatty acid amide and fatty acid nitride stage. However, the nitrile may also be directly prepared from the fat with ammonia. By virtue of these reactions, the fatty amines have the same number and the same structure as the fatty alcohols and fatty acids mentioned above. The amino groups may also be substituted by an $R^1$ group, where $R^1$ is an alkyl group containing 1 to 30 carbon atoms and, more particularly, 1 to 18 carbon atoms. Corresponding fatty derivatives containing SH groups instead of OH group may also be used. The fatty derivatives may of course also be prepared by petrochemical methods and may even have an odd number of carbon atoms.

The paste according to the invention may consist a) of a product of the direct or indirect reaction of a polyisocyanate with a fatty derivative in combination with a "liquid polyisocyanate" and b) solely of a reaction product of a polyisocyanate. Mixtures of a) and b) are of course also possible.

Variant a) is a gel structure of at least two components, the solid gel-forming component being a reaction product of a polyisocyanate containing on average 1 to 10, preferably 1 to 5 and more preferably 1 to 4 terminal groups of fatty derivatives and the dispersant being a "liquid polyisocyanate" containing on average 1 to 6 and preferably 1 to 4 isocyanate groups per molecule.

The polyisocyanates are, above all, compounds containing 1 to 10, preferably 1 to 4 and more preferably 3 isocyanate groups per molecule. In principle, any aliphatic and aromatic polyisocyanates may be used, although aliphatic polyisocyanates are preferred.

The following are mentioned as suitable polyisocyanates: phenyl isocyanate, 1,5-naphthylene diisocyanate, 4,4'-diphenyl methane diisocyanate (MDI), hydrogenated MDI ($H_{12}$MDI), xylylene diisocyanate (XDI), tetramethyl xylylene diisocyanate (TMXDI), 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of toluene diisocyanate (TDI), optionally in the form of a mixture, 1-methyl- 2,4-diisocyanatocyclohexane, 1,6-diisocyanato-2,2,4-trimethylthexane, 1,6-diisocyanato-2,4,4-trimethyl hexane, 1-isocyanatomethyl-3-isocyanato-1,5,5trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6diisocyanate (HDI), dicyclohexyl methane diisocyanate, cyclohexane-1,4-diisocyanate, ethylene diisocyanate, phthalic acid-bis-isocyanatoethyl ester; polyisocyanates containing reactive halogen atoms, such as 1-chloromethylphenyl-2,4-diisocyanate, 1-bromomethylphenyl-2,6-diisocyanate, 3,3bis-chloromethyl ether-4,4'-diphenyl diisocyanate. Sulfur-containing polyisocyanates are obtained, for example, by reaction of 2 moles of hexamethylene diisocyanate with 1 mole of thiodiglycol or dihydroxydihexyl sulfide. Other important diisocyanates are trimethyl hexamethylene diisocyanate, 1,4-diisocyanatobutane, 1,12-diisocyanatododecane and dimer fatty acid diisocyanate.

Also of interest are partly masked polyisocyanates from which self-crosslinking polyurethanes can be formed, for example dimeric toluene diisocyanate, or polyisocyanates partly or completely reacted, for example, with phenols, tertiary butanol, phthalimide, caprolactam.

In one particular embodiment, the isocyanate component contains dimer fatty acid isocyanate. Dimer fatty acid is a mixture of predominantly $C_{36}$ dicarboxylic acids which is produced by thermal or catalytic dimerization of unsaturated $C_{18}$ monocarboxylic acids, such as oleic acid, tall oil fatty acid or linoleic acid. Dimer fatty acids have long been known to the expert and are commercially available. The dimer fatty acid may be reacted to form dimer fatty acid isocyanates. Technical dimer fatty acid diisocyanate contains on average at least two and less than three isocyanate groups per molecule of dimer fatty acid.

Diisocyanates trimerized to isocyanurates, for example the isocyanurate of HDI and IPDI, are particularly suitable for the production of low-diisocyanate one-component reactive PUR adhesives. It is known that the trimerization reaction is carried out in the presence of suitable trimerization catalysts (see, for example, Kunststoff-Handbuch, Vol. 7, Polyurethane, page 108). Mixtures of cyclotrimers of aliphatic and cycloaliphatic diisocyanates, especially mixed trimers thereof, are particularly advantageous. The HDI biuret may also be used.

The higher homologs of MDI containing three or more isocyanate groups per molecule (=polymer MDI) obtainable, for example, by removing the difunctional isocyanate from the technical MDI by distillation (=crude MDI) are also suitable for the same purpose. The same applies to so-called tri-MDI, the trifunctional homolog of MDI.

Higher homologs of MDI (polymer MDI) or aliphatic polyisocyanates, more especially trimerized diisocyanates and, above all, trimerized HDI, are preferably used as, quantitatively, the principal component of the polyisocyanates.

It may be appropriate to use oligomerized NCO-terminated adducts of the above-mentioned isocyanates and polyols, polyamines or amino alcohols, more especially adducts of aliphatic isocyanates. It is also appropriate to use polyisocyanates of high molecular weight, for example prepolymers of diols or triols with an excess of diisocyanates. The diols or triols are polyesters or polyethers. The polyols are preferably 1 to 5 and more preferably 1 to 3 of the organic polyhydroxyl compounds known per se for the production of high molecular weight compounds in PUR chemistry. Particularly suitable polyols are the polyhydroxypolyethers known per se with molecular weights of 60 to 10,000 and preferably 70 to 6,000 which contain from 2 to 10 hydroxyl groups per molecule. Polyhydroxypolyethers such as these are obtained in known manner by alkoxylation of suitable starter molecules, for example water, propylene glycol, glycerol, trimethylol propane, sorbitol, cane sugar, amino alcohols, such as ethanolamine or diethanolamine, or aliphatic amines, such as n-hexylamine or 1,6-diaminohexane, and mixtures of such starter molecules. Suitable alkoxylating agents are, above all, propylene oxide and optionally ethylene oxide.

The usual polyester polyols with molecular weights of 400 to 10,000 may also be used providing they contain 2 to 6 hydroxyl groups. Suitable polyester polyols are the reaction products known per se of excess quantities of polyhydric alcohols of the type already mentioned by way of example as starter molecules with polybasic acids, for example succinic acid, adipic acid, phthalic acid, tetrahydrophthalic acid or mixtures of such acids.

Polycarbonate polyols may also be used.

It is also possible to use a) partial esters of saturated and unsaturated fatty acids with polyhydroxy compounds and ethoxylated or propoxylated derivatives thereof, b) saturated and unsaturated fatty alcohols, c) starch, sugar and cellulose and derivatives thereof, d) ring-opening products of epoxidized triglycerides or fatty acid esters with alcohols, carboxylic acids, amines and water and corresponding alkoxylated derivatives and e) castor oil or castor oil derivatives.

Instead of alcohols, polyfunctional primary or secondary amines may also be used as chain constituents. The same also applies to aminocarboxylic acids and low molecular weight protein compounds. Specific examples are polyoxyethylene, polyoxypropylene and polyoxybutylene diamine—both the homopolymers and copolymers based on these monomers—with molecular weights of up to 5,000 (Jeffamine) and glycine, alanine, valine, leucine, cysteine, cystine, aspartic acid, glutamic acid, tyrosine, tryptophane, eta-amino caproic acid, 11-aminoundecanoic acid, 4-aminobutyric acid, mono- and diaminonaphthoic acid. The percentage content of these substances should be less than 20 mole-% and preferably 10 mole-%, based on the polyols.

The relatively high molecular weight polyols are particularly appropriate where a large excess of isocyanate groups is used.

The monofunctional fatty derivatives mentioned above are reacted with the polyisocyanates likewise mentioned above in known manner.

The equivalence ratio of isocyanate groups to the reactive hydroxyl, amino and carboxyl groups may be from 0.9:1 to 10:1 and is preferably in the range from 1:1 to 5:1. In that case, the number of terminal groups of fatty derivatives is on average at most 10, preferably at most 5 and more preferably at most 4 per molecule.

Suitable "liquid polyisocyanates" are any of the polyisocyanates mentioned above providing they have a viscosity of at most 30 Pas and preferably at most 10 Pas at 20° C. In addition, the number of their NCO groups should not exceed 6 and, in particular, 4 per molecule. On the other hand, the "liquid polyisocyanate" should contain on average at least 2 and, more particularly, 2 to 5 isocyanate groups per molecule. The polyisocyanates used as "liquid polyisocyanates" are preferably isocyanurates or NCO prepolymers.

According to variant b, however, the paste according to the invention may also be based on a single solid PUR component. In this case, it has an average of 1 to 4 fatty derivatives and at least 1.5 and preferably 2 to 4 isocyanate groups per molecule.

Suitable fatty derivatives and polyisocyanates are, again, the substances mentioned above. Preferred polyisocyanates are prepolymers which contain an average of at least 1.5 and preferably 2 to 4 aliphatic and/or aromatic isocyanate groups.

The reaction of the isocyanate groups with the hydroxyl, amino and carboxyl groups and later with water may be accelerated by addition of catalysts. Preferred catalysts are tertiary amines which combine firmly with the polymer chains. Their concentration may thus be increased several times without any danger that they could migrate, for example like a plasticizer, or give rise to toxicological disadvantages. Accordingly, the one-component reactive PUR adhesive according to the invention preferably contains at least one tertiary amine containing at least one functional group for incorporation in the polymer chain as catalyst. The number of functional groups of the tertiary amine is preferably two although there may also be three or one functional group(s) per tertiary amine. The number of these reactive tertiary amines is at least and preferably one. However, two different tertiary amines differing, for example, in their functionality could also be effectively used. In theory, there is no upper limit to the number of reactive tertiary amines although, in practice, it should not be any greater than five. The tertiary amine may be completely or partly replaced by a quaternary ammonium compound. The reactive tertiary amines best contain the following functional groups: —OH, —SH, —COOH, —NCO, —NH$_2$ and —NHR, where R is an alkyl group containing 1 to 25 carbon atoms. Hydroxyfunctional amines are preferably used. Actual compounds are N,N-dimethyl ethanolamine, N,N-dimethyl diaminoethane, N-methyl diethanolamine, N,N-dimethyl-2-(2-dimethylaminoethoxy)-ethanol, N,N,N-trimethyl-N-hydroxyethyl diaminoethane bis-aminoethyl ether, N,N-bis-(3-dimethylaminopropyl)-N-isopropanolamine, tetramethylimino -bis-propylamine and N-(3-dimethylaminopropyl)-N,N-diisopropanolamine. The reactive tertiary amine should best be used in a quantity of 1 to 30 g and preferably 2 to 10 g per 100 g of prepolymer. Outside these ranges, disadvantages arise either because there is a distinct reduction in reactivity or because the adhesive becomes brittle. By virtue of the high concentration of catalyst, even aliphatic isocyanate groups react sufficiently quickly at room temperature and, in spite of this, are surprisingly stable in storage.

Besides these incorporable catalysts, the usual catalysts, more particularly the following tertiary amines, may be used either on their own or in conjunction with other catalysts: diazabicyclooctane (Dabco), triethylamine, dimethyl benzylamine (Desmorapid DB, BAYER AG), bis-dimethylaminoethyl ether (Catalyst A I, UCC), tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-diaminoethyl)-ether, N,Ndimethyl piperazine, N-(2-hydroxyethoxyethyl)-2-azanorbornane, Tacat DP-914 (Texaco Chemical), Jeffcat™, N,N,N,N-tetramethyl butane-1,3-diamine, N,N,N,N-tetramethyl propane-1,3-diamine, N,N,N,N-tetramethyl hexane-1,6-diamine.

The catalysts may even be present in oligomerized or polymerized form, for example as N-methylated polyethylene imine.

Other suitable catalysts are 1-methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethyl aminopyridine, 4-pyrrolidinopyridine, 4-morpholinopyridine, 4-methyl pyridine and N-dodecyl-2-methyl imidazole.

Besides the tertiary amines, other catalysts may be added, above all organometallic compounds, such as tin(II) salts of carboxylic acids, strong bases, such as alkali metal hydroxides, alcoholates and phenolates, for example di-n-octyl tin mercaptide, dibutyl tin maleate, diacetate, dilaurate, dichloride, bis-dodecyl mercaptide, tin(II) acetate, ethyl hexoate and diethyl hexoate or lead phenyl ethyl dithiocarbamate. DABCO, TMR-2 etc. (Air products), which are quaternary ammonium salts dissolved in ethyl glycol, are mentioned as trimerization catalysts.

In addition, the paste according to the invention may contain additives. Of particular importance in this regard are additives which improve tackiness and which thus lead to good adhesion, even in cases where the substrates are pressed briefly and lightly together. Suitable tackifiers are, above all, resins. Resins in the present context are understood to be liquid to solid, organic amorphous products with a broad molecular weight distribution and hence with a broad softening range (see DIN 55958). The resins should not react with the NCO groups under the storage conditions (mainly room temperature, 12 months). Useful synthetic resins include hydrocarbon (petroleum) resins and urea, alkyd, epoxy, melamine, phenolic, polyester, unsaturated polyester, polyurethane, ketone, coumarone/indene, isocyanate, polyamide and terpene/phenol resins. Useful natural resins are any of the non-NCO-reactive resins which are listed, for example, in KARSTEN's "Lackrohstoff-Tabellen", 9th Edition, 1992, Vincentz Veriag, Hannover and in JORDAN's "Klebharze", Hinterwalder Verlag, Munchen 1994. Preferred resins include phenolic resins, hydrocarbon resins and rosin and its derivatives, particularly the methyl esters of partly hydrogenated rosin, such as diabietyl phthalate. The resins are used in a quantity of 0 to 80% by weight and, more particularly, 1 to 50% by weight, based on the mixture as a whole.

Other suitable tackifiers are polymers together with solvents, optionally even together with resins. The polymers also should not react with the NCO groups. Suitable polymers are, above all, natural and synthetic rubbers, polyacrylates, styrene acrylates, polyesters, polychloroprenes, polyisobutenes, polyvinyl esters (for example polyvinyl acetates), polyvinyl ethers and polyurethanes. Among the radical-polymerizable monomers, monomer combinations of any type are also capable of being converted into suitable polymers. The polymers are used in a quantity of 0 to 80% by weight and, more particularly, 2 to 25% by weight, based on the mixture as a whole.

Suitable solvents for these polymers are any inorganic and organic substances which are liquid at 20° C. and in which the polymer dissolves in a quantity of at least 2 g per 100 g of solvent at room temperature. Preferably, the PU prepolymer should also dissolve in the solvent. Naturally, the solvents also should not react with the NCO group.

If the molecular weight of the prepolymers increases, the smoothness with which the paste rubs off onto the substrate may possibly be no longer guaranteed. In that case, it is appropriate to add a solvent to the prepolymer. Suitable solvents are any inorganic or organic substances in which the PU prepolymer dissolves in a quantity of at least 2 g per 100 g of solvent at 20° C. Polar liquids, such as acetone, give transparent to opaque mixtures while nonpolar liquids give white mixtures. The solvent is added in a quantity of 0 to 80% by weight and, more particularly, 2 to 45% by weight, based on the mixture as a whole. Naturally, these solvents also should not react with the NCO group. Solvents with a low evaporation index, more particularly below 3.0, based on diethyl ether, are preferred. One example of such a solvent is acetone. Solvents are also particularly preferred if, in addition, they have a high boiling point, more particularly a boiling point above 70° C. at normal pressure. One example of such a solvent is isooctane. The addition of solvents to the PU prepolymers affects not only the smoothness with which the paste rubs off, but also its early adhesion.

In addition, the paste according to the invention may contain typical additives such as, for example, fillers (particularly fine-particle silica, chalk, clays and fibers), pigments, soluble dyes (particularly fluorescent dyes), defoamers, adhesion promoters, non-NCO-reactive plasticizers, antiagers and $CO_2$-absorbing or adsorbing additives, for example molecular sieves and silica gel. However, substances which react chemically with $CO_2$, for example CaO, may also be added.

Other additives are typically added in the following quantities: filler 0 to 50% by weight, pigments and dyes 0 to 20% by weight, plasticizers 0 to 20% by weight and other additives 0 to 10% by weight, based on the paste as a whole.

In its physical properties, the paste according to the invention is reminiscent of waxes, particularly paraffin waxes. It is firm, but rubs off onto the substrate, at 20° C. It melts distinctly, i.e. within 5° C., in the temperature range from 40 to 100° C. The melt is clear. Even just above the melting range, it has a relatively low viscosity and is only very slightly stringy. After cooling from the melt, the paste is opaque to transparent or has a color brought about by the additives introduced.

The paste is also reminiscent of waxes in its rubbing behavior. When the paste is rubbed onto a surface, it leaves a thin layer behind. This rubbing behavior distinguishes the paste according to the invention from typical solid polyurethanes with their rubber-elastic properties which make rubbing off onto a substrate impossible.

The paste according to the invention differs from waxes in the tackiness of the layer rubbed off. Early adhesive strength (after 1 minute) is as high as that of hitherto known adhesive sticks. Accordingly, the bond can still be corrected. After curing with moisture either from the air or from the substrate, there is a drastic increase in adhesive strength which reaches values that are clearly above those reached by known adhesive sticks. After curing, the bond is relatively resistant to water and solvents in general. It is also relatively temperature-resistant.

To avoid premature curing, the adhesive has to be packed in moisture-tight containers.

Since the paste according to the invention, although firm, rubs off smoothly onto substrates, it is best used in geometric form, more particularly cylindrical form. The cylinder may have a circular, oval or polygonal cross-section. Its size will be determined by the application envisaged, for example by the required width of area to be covered.

The paste according to the invention may be molded as follows: the liquid melt is poured into corresponding containers or molds and cooled therein. At the same time, it also solidifies. The paste may also be punched out from hardened blocks.

By virtue of its properties, the paste according to the invention is suitable for coating, filling, sealing and, in particular, for bonding. Where it is used for coating, the paste may be applied as a paint, as a conductive coating, as a correcting layer, as a lacquer coat or as a repair layer. Where it is used for bonding, the paste according to the invention may be applied as a contact adhesive and, above all, as a one-component, moisture-reactive broad-spectrum adhesive.

By virtue of these properties, the adhesive is suitable for the production of adhesive sticks. Adhesive sticks are understood to be adhesives in stick form which are mounted for displacement in a closable tube and which leave behind a tacky film when rubbed onto a surface. The compressive strength of such adhesive sticks with a diameter of 16 mm is of the order of 30 to 70 N. By virtue of their handiness and their extremely high adhesive strength, adhesive sticks can be used for many purposes, for example for bonding damaged furniture veneers, for repairing toys and household goods, such as the straps of leather handbags, etc.

The invention is illustrated by the following Examples.

I. Startina materials for the Examples:

Tris-(6-isocyanatohexyl)-isocyanate: trade name Tolonate HDT-LV, as polyisocyanate Octadecanol: trade name Lorol C 18, OH value 207; PEG 600: polyethylene glycol, OH value 187.5, as polyols Dibutyl tin dilaurate: trade name Stanclere DBTL; bis-(2-dimethyl-aminoethyl)-ether: trade name Jeffcat ZF 20, as a catalysts.

II. Production of the paste

EXAMPLE 1

| No. | Name | g/100 g | Molar Ratio |
|---|---|---|---|
| 1 | Tris-(6-isocyanatohexyl)-isocyanate | 50.0 | 1 |
| 2 | Octadecanol | 49.0 | 2 |
| 3 | Dibutyl tin dilaurate | 0.01 | |
| 4 | Bis-(2-dimethylaminoethyl)-ether | 1.0 | |

NCO:OH ratio 1.5:1

The polyisocyanate (1) and the catalyst (3) were added to the octadecanol (2) melted at 70° C. and added for about 3 hours at 90° C. until the content had reached its final value of 3.8%. The NCO content was determined titrimetrically by Spiegelberger's method in which dibutyl amine is reacted with the NCO-containing substance in ethyl acetate as solvent and the excess is back-titrated with hydrochloric acid. At the end of the reaction, amine catalyst (4) was added. The end product was poured into a suitable pack and, after cooling, formed a firm paste which could be rubbed under a certain pressure onto various substrates to which it adhered after curing with moisture from the air.

EXAMPLE 2

| No. | Name | g/100 g | Molar Ratio |
|---|---|---|---|
| 1 | Tris-(6-isocyanatohexyl)-isocyanate | 8.1 | 1 |
| 2 | Octadecanol | 11.9 | 3 |
| 3 | Dibutyl tin dilaurate | 0.01 | |

NCO:OH ratio 1.0:1

The polyaddition was carried out as in Example 1 except that the reaction was continued until an NCO content of 0% was reached. Components 4 and 5 were then added to the melt, followed by stirring for 2 hours at 90° C.

| No. | Name | g/100 g | Molar Ratio |
|---|---|---|---|
| 4 | Tris-(6-isocyanatohexyl)-isocyanate | 62.1 | 4 |
| 5 | Polyethylene glycol 600 | 16.9 | 1 |
| 6 | Bis-(2-dimethylaminoethyl)-ether | 1.0 | |

After component (6) had been stirred in, followed by cooling, a firm, smooth-rubbing, moisture-reactive adhesive paste was obtained as in Example 1 and had more internal strength than Example 2.

EXAMPLE 3

Example 3 had the same composition as Example 2. However, the procedure was different. Components (1) to (5) were weighed in together and added for 5 hours at 90 to 100° C. After an NCO content of 11.9% had been reached, amine catalyst (6) was added. The paste obtained after cooling had both a higher internal strength and better adhesive properties than Example 2.

EXAMPLE 4

| No. | Name | g/100 g | Molar Ratio |
|---|---|---|---|
| 1 | Tris-(6-isocyanatohexyl)-isocyanate | 29.4 | 2 |
| 2 | Octadecanol | 10.9 | 1.5 |
| 3 | Polyester 230* | 38.9 | 0.75 |
| 4 | Bis-(2-dimethylaminoethyl)-ether | 0.8 | |
| 5 | Acetone | 20.0 | |

*Polyester 230 = polyester of isophthalic acid/adipic acid/diethylene glycol
NCO:OH ratio: 2.0:1

The starting materials listed above were reacted as in Example 3 except that the solvent was stirred in just before cooling. The reaction products were firm but did rub off and contained NCO groups. Their adhesive properties are apparent from the following Table.

III. Tests

The strength of the paste was determined as compressive strength. In addition, the rub-off behavior of the paste, which should enable it to be easily applied as a uniform coating, and the ultimate strength of single-overlap bonds with beech plywood were determined.

The results are set out in the following Table

| | Example 1 | Example 2 | Conventional Soap Gel Stick | Example 3 | Example 4 |
|---|---|---|---|---|---|
| Compressive strength [N] | >>200 | 10 | 50 | 30 | |
| Ultimate strength [MPa] on wood | 4.8 | 6.9 | 1.5 | 9.5 | |
| Ultimate strength [MPa] on wood/PMMA (Plexiglas) | 2.9 | 4.0 | 0.8 | 7.6 | |
| Rub-off | <0.2 | 0.41 | 0.3 | 0.38 | |
| Early adhesion | – | – | +/– | – | + |

The tests were based on the following methods:

Rub-off

In addition to a subjective evaluation, rub-off was measured using a specially designed instrument (manufactured by BVI of Wuppertal).

Principle: a cylindrical stick of the paste to be rubbed off with a diameter of 16 mm was clamped in a holder and pressed under a defined pressure of 4.5 N onto a strip of paper (5.7 mm wide) running past at a constant speed (1.8 m/minute). The cash register paper running past rubs the paste off, the reduction in the length of the cylinder per meter of paper being determined as a measure of the rub-off. Evaluation is carried out on the following scale:

The temperature is 20° C. unless otherwise stated.

| Rub-off [mm/m] | Evaluation |
|---|---|
| ≤0.1 | Very hard |
| ≤0.2 | Hard |

-continued

| Rub-off [mm/m] | Evaluation |
|---|---|
| ≦0.3 | Optimal |
| ≦0.4 | Soft |
| ≦0.5 | Very soft |

Compressive Strength

Compressive strength is defined as the maximum load measured when the stick collapses under pressure applied parallel to its longitudinal axis.

Compressive strength is measured with an Erichsen model 464L (measuring head 709) compressive strength tester (manufacturer: Erichsen, Simonschöfchen 31, 56 Wuppertal 11).

The adhesive with a minimum length of 30 mm cut off immediately above the plunger is placed between two holders in the form of disks of rigid PVC which have a thickness of around 10 mm and a circular 3 mm deep depression adapted to the particular stick diameters. The stick provided with the holders is placed centrally on the table of the compressive strength tester. The height of the force measuring instrument above the table is adapted to the height of the test specimen. The measuring head is then advanced towards the stick to be tested at a rate of about 7 mm per minute. After the highest compressive force has been reached, the value is read off from the digital display.

Setting Time

To determine whether the adhesive properties of the sticks are adequate for the purpose envisaged, test bondings are carried out by hand under certain processing conditions and evaluated. The following procedure is adopted:

A supply of white chromo paper (weight per unit area around 100 g/m²) coated on one side and adhesive sticks to be tested are conditioned for at least 24 hours at 20° C./65% relative air humidity. The test paper is cut into strips 5 cm wide and around 30 cm long. An adhesive stick is longitudinally rubbed twice under uniform pressure over the uncoated side of the paper strip with the object of producing a uniform coating. Immediately afterwards, a second strip of paper which has not been coated with adhesive is placed on the coated strip with its uncoated side facing inwards and is then rubbed on by hand. An attempt is then made to separate the paper strips slowly from one another. The time at which the strips of paper will only separate where they are bonded by tearing over their full width characterizes the setting time.

Open Time

The open time is the time after application of the adhesive within which the materials to be bonded have to be fitted together to obtain complete tearing of the paper after setting in the separation test. The method corresponds to the setting time test except that the strips of paper are only fitted together a certain after application of the adhesive. Beginning after 15 seconds, the open time may be graduated, for example, at further 15 second intervals. In the case of slow-setting adhesives with a predictable longer open time, the intervals selected will be correspondingly longer.

Early Holding

The test is carried out in a standard climate of 23° C./50% relative air humidity in which the test specimens of beech plywood are stored for at least 3 days. Two test specimens measuring 80 mm×25 mm×4 mm are coated with the particular adhesive with an overlap 20 mm in length, corresponding to an overlap area of 500 mm², pressed together for 5 seconds under a pressure of 0.2 N/mm² and immediately subjected to a shear force of 200 g. The test is passed if the parts do not shift relative to one another after 1 hour.

Ultimate Strength

Tensile shear strength (TSS) was determined by bonding beech plywood test specimens which had been stored at 23° C./50% relative air humidity with an overlap on one side and measuring the tensile shear strengths after 3 days with a tensile shear tester advancing at 50 mm/min.

Viscosity

Viscosity was measured with a Brookfield viscosimeter unless otherwise indicated.

What is claimed is:

1. A firm, smooth-rubbing adhesive paste, free of water, comprising a solid reaction product of a polyisocyanate component and a monofunctional fafty derivative component, wherein the reaction product contains moisture reactive isoyanate groups.

2. The paste of claim 1 wherein said reaction product is formed by the reaction of the polyisocyanate component with on average from 1 to 10 terminal groups of fatty derivatives.

3. The paste of claim 1 wherein the monofunctional fatty derivative component contains from 8 to 22 carbon atoms and has a functional group thereon selected from the group consisting of COOH, OH, $NH_2$, $NHR^1$ and SH wherein $R^1$ is an alkyl or aryl group containing from 1 to 30 carbon atoms.

4. The paste of claim 1 wherein the paste has a moisture reactive isocyanate content of from 0.5 to 20 g NCO per 100 g of paste.

5. The paste of claim 1 wherein the reaction product contains from 9 to 1 unreacted NCO groups per molecule of polyisocyanate.

6. The paste of claim 1 further comprising a liquid polyisocyanate component acting as a dispersant for the solid reaction product.

7. The paste of claim 6 wherein the liquid polyisocyanaze component contains 3 isocyanate groups per molecule of liquid polyisocyanate.

8. The paste of claim 6 wherein the liquid polyisocyanate is selected from the group consisting of isocyanurates and NCO prepolymers.

9. The paste of claim 1 wherein the solid reaction product is formed by reaction of the fatty derivative component with the polyisocyanate component which contains an average of at least 1.5 isocyanate groups.

10. The paste of claim 1 wherein the solid reaction product is formed by the reaction of the fatty derivative component with the polyisocyanate component which contains an average of 2 to 4 isocyanate groups.

11. The paste of claim 1 wherein the polyisocyanate component is a prepolymer containing an average of at least 1.5 isocyanate groups per molecule.

12. The paste of claim 1 further comprising a catalyst present in an amount of from 1 to 30 grams per 100 grams of prepolymer.

13. The paste of claim 12 wherein the catalyst is selected from the group consisting of tertiary amines, organometallic compounds, alkali metal hydroxides, alkali metal alcoholates, and alkali metal phenolates.

14. The paste of claim 1 further comprising up to 80% by weight, based on the weight of the paste, of an additive selected from the group consisting of a resin, a polymer, a solvent and mixtures thereof.

15. A process for bonding a substrate comprising applying an effective amount of the adhesive paste of claim 1 onto the substrate.

16. A process for making a water-free, firm, smooth-rubbing adhesive paste containing moisture reactive isocyanate groups comprising the steps of:

(a) providing a polyisocyanate component;

(b) providing a co-reactant component comprising a polyol and a monofinctional fatty derivative component; and (c) reacting the polyisocyanate component and the co-reactant component at an equivalence ratio of isocyanate groups to reactive functional groups of from 5:1 to 1:1 such that an excess of isocyanate groups remain following the reaction, to form the adhesive paste.

17. The process of claim 16 wherein the monofunctional fatty derivative component contains from 8 to 22 carbon atoms and has a functional group thereon selected from the group consisting of COOH, OH, $NH_3$, $NHR^1$ and SH wherein $R^1$ is an alkyl or aryl group containing from 1 to 30 carbon atoms.

18. The process of claim 16 wherein the adhesive paste further comprises a liquid polyisocyanate containing 3 isocyanate groups per molecule, acting as a dispersant.

19. The process of claim 18 wherein the liquid polyisocyanate is selected from the group consisting of isocyanurates and NCO prepolymers.

20. The process of claim 16 wherein the polyisocyanate component is a prepolymer containing an average of at least 1.5 isocyanate groups per molecule and wherein the adhesive paste further comprises a catalyst present in an amount of from 1 to 30 grams per 100 grams of prepolymer.

* * * * *

UNITED STATES PATENT AND TRADEMARK OFFICE
CERTIFICATE OF CORRECTION

PATENT NO. : 6,316,573 B1
DATED : November 13, 2001
INVENTOR(S) : Klauck et al.

It is certified that error appears in the above-identified patent and that said Letters Patent is hereby corrected as shown below:

<u>Column 12,</u>
Line 10, delete "fafty", and insert therefor -- fatty --.
Line 12, delete "isoyante", and insert therefor -- isocyanate --.
Line 31, delete "polyisocyanaze", and insert therefor -- polyisocyanate --.
Line 66, delete "monofinctional", and insert therefor -- monofunctional --.

Signed and Sealed this

Thirteenth Day of May, 2003

JAMES E. ROGAN
*Director of the United States Patent and Trademark Office*